M. BRANDSTÄTTER.
IGNITER.
APPLICATION FILED JULY 19, 1911.
1,017,505.
Patented Feb. 13, 1912.
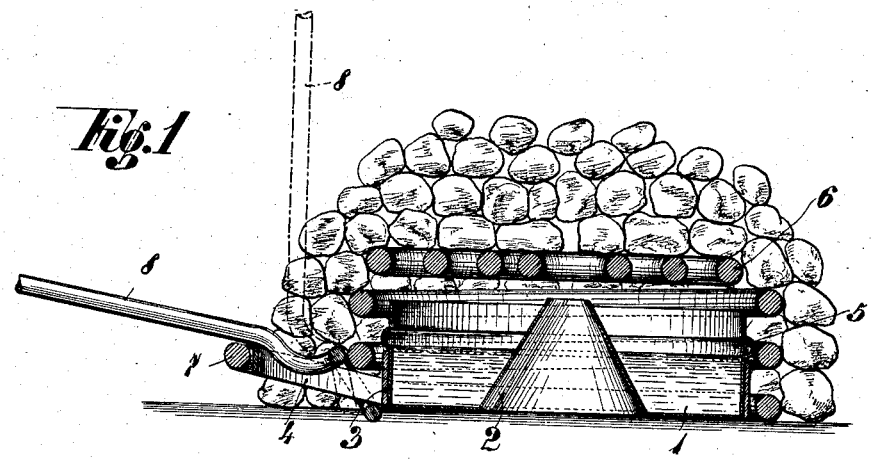
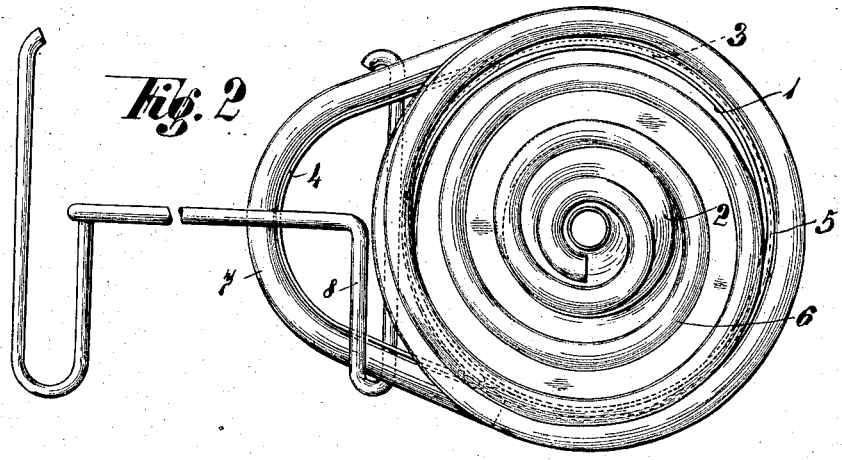
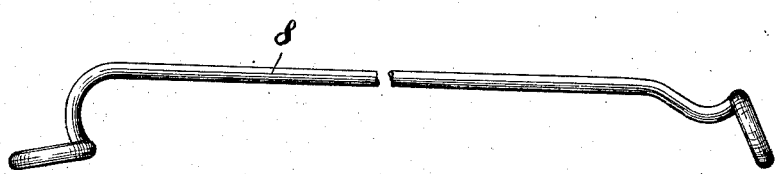
Witnesses:
Inventor,
Michael Brandstätter,
By Glenn S. Noble
Att'y

UNITED STATES PATENT OFFICE.

MICHAEL BRANDSTÄTTER, OF VIENNA, AUSTRIA-HUNGARY.

IGNITER.

1,017,505.      Specification of Letters Patent.      Patented Feb. 13, 1912.

Application filed July 19, 1911. Serial No. 639,267.

*To all whom it may concern:*

Be it known that I, MICHAEL BRANDSTÄTTER, engineer, a subject of the Emperor of Austria-Hungary, residing at XIII Linzerstrasse 48, Vienna, Austria-Hungary, have invented new and useful Improvements in Igniters, of which the following is a specification.

My invention relates to certain improvements in igniting devices.

It has for its object the provision of a vessel for liquid fuels covered by a cap-like grate, adapted to receive the solid fuel, a handle being provided for setting the said vessel and grate together into the hearth or stove.

Preferably the vessel is provided centrally with a sleeve formed like an inverted funnel and serving for the access of air, while the grate is made from a spirally wound wire. The reversible handle is bent twice on both ends in such a way, as to afford the inflaming device to be set in from the side or from top, as the construction of the stove or the like will permit it.

For the liquid fuel petroleum, spirit or a similar easily inflammable material can be taken.

In the drawings, forming part of this specification, an example is shown of the invention, Figure 1 being a side elevation, partially in section and Fig. 2 a top plan view of my improved inflaming device, while Fig. 3 is in detail the handle of the same.

Referring to the drawings, 1 indicates a vessel, provided with a central sleeve 2, projecting upward from the bottom of said vessel and formed like an inverted funnel, serving for the access of air. Preferably the vessel is resting within a collar 3, having an ear 4. The vessel further has a mark 5 in the shape of an annular corrugation, which is to serve as a limit, to which the liquid fuel must be filled in, if the device is to be taken into use.

The vessel 1 is covered with a kind of grate, upon which the solid fuel, for example coals, coke or the like is to be placed, after the vessel has been filled with the liquid fuel, the grate covered on top of the vessel and the whole placed into the hearth or the like. The grate is preferably formed in the shape of a cap and is composed from a wire 6 spirally wound and formed on one of its ends to an ear 7, which is encircling the ear 4 of the vessel 1, so that both ears can be seized simultaneously by a suitably shaped handle 8.

The handle 8 is formed from a metal bar, the ends of which have a double curvature of such a different manner, that the one end may be used for seizing and inserting the device through a lateral fire-door, while the other end is adapted to seize and insert the device through an opening on top of the fire-place. The curved portions embrace in both cases the two ears 4 and 7 and the straight shank of the handle is in the first case resting upon the ears, while in the second case it is projecting vertically upward as shown in dotted lines in Fig. 1.

The inflaming device according to the present invention is to be used in the following way. After the vessel 1 has been filled with a liquid fuel, preferably petroleum up to the mark 5, the grate 6 is covered upon the same and the device placed into the hearth or stove. Now a layer of round coals is placed upon and next to the grate in such a manner that sufficient room is still left for igniting the petroleum. Hereupon the petroleum or the like is ignited. If now the petroleum is burning, the grate is to be covered entirely with coals. The coal will ordinarily catch fire within a few minutes after the petroleum has been lighted in the igniter. In about 15 or 20 minutes after the petroleum is lighted, the igniter may be removed from the fireplace either with the hook of the handle 8, or with a poker.

Thus by the present invention a new and improved igniting device is obtained, which is as well to be manufactured at low costs, as it is available under all circumstances. It is nearly indestructible and of very low weight, also its handling is most convenient and cleanly.

Having now fully described my invention, what I claim as new and desire to secure by Letters Patent is—

1. An igniting device for hearths, stoves and the like, comprising a vessel for the igniting liquid fuel, said vessel having an opening in its bottom, a pipe or sleeve centrally arranged on said vessel and projecting upward from said opening, a grate formed from a spirally wound wire in a cap like shape covering said vessel, ears connected with the said vessel and grate, and a detachable handle adapted to seize the said ears, substantially as described.

2. An igniting device for hearths, stoves and the like, comprising a vessel, a grate covering said vessel, a pipe or sleeve on the vessel, ears connected with the vessel and grate, the ear (7) of the grate encircling the ear (4) of the vessel, and a handle (8) for simultaneous seizing the said two ears, substantially as described.

3. An igniting device for hearths, stoves and the like, comprising a vessel, a grate covering said vessel, a pipe or sleeve on the vessel, ears connected with the vessel and grate, a handle for seizing the two ears, one end of said handle being bent so that when it is in engagement with the device, the handle will be substantially vertical, and the other end being bent so that when it is in engagement with the device, the handle will be substantially horizontal.

In testimony whereof I affix my signature in presence of two witnesses.

MICHAEL BRANDSTÄTTER.

Witnesses:
 OREFORD BERAN,
 AUGUST FUGGER.

Copies of this patent may be obtained for five cents each, by addressing the "Commissioner of Patents. Washington, D. C."